(12) United States Patent
Minotani et al.

(10) Patent No.: US 11,454,607 B2
(45) Date of Patent: Sep. 27, 2022

(54) CRACK DETECTION DEVICE AND METHOD THEREFOR

(71) Applicant: Nippon Telegraph and Telephone Corporation, Tokyo (JP)

(72) Inventors: Tadashi Minotani, Musashino (JP); Eri Matsunaga, Musashino (JP); Masahito Nakamura, Musashino (JP); Masayuki Tsuda, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/285,431

(22) PCT Filed: Nov. 1, 2019

(86) PCT No.: PCT/JP2019/043146
§ 371 (c)(1),
(2) Date: Apr. 14, 2021

(87) PCT Pub. No.: WO2020/100641
PCT Pub. Date: May 22, 2020

(65) Prior Publication Data
US 2021/0364459 A1    Nov. 25, 2021

(30) Foreign Application Priority Data
Nov. 15, 2018   (JP) .............................. JP2018-214708

(51) Int. Cl.
*G01N 27/02*   (2006.01)
*G01N 27/90*   (2021.01)

(52) U.S. Cl.
CPC ....... *G01N 27/028* (2013.01); *G01N 27/9046* (2013.01); *G01N 27/9073* (2013.01)

(58) Field of Classification Search
CPC ....... G01N 2291/018; G01N 2291/101; G01N 27/028
See application file for complete search history.

(56) References Cited

PUBLICATIONS

Crack Detection Tool for Concrete Structures, Literature, Feb. 6, 2018, http://www.kurabo.co.ip/chem/kk_crack_sensor.html, pp. 1 and 2.
(Continued)

*Primary Examiner* — Alesa Allgood
(74) *Attorney, Agent, or Firm* — Workman Nydegger

(57) ABSTRACT

A crack detection device includes: a sensor unit that has a three-layer structure of conductor-insulator-conductor and is attached to a structure; a frequency characteristics acquisition unit that sweeps a predetermined frequency range to acquire a plurality of frequencies at which the impedance of the sensor unit is maximum or minimum; a crack presence/absence determination unit that determines the presence or absence of a crack based on a nonuniformity of the plurality of frequencies; a crack position table in which a relationship between crack positions and frequency shift directions is recorded; and a crack position detection unit that, when the crack presence/absence determination unit determines that there is a crack, takes a difference between two frequencies acquired by the frequency characteristics acquisition unit to determine a sign, and then refers to the crack position table in accordance with the sign to detect a crack position.

3 Claims, 5 Drawing Sheets

(56) References Cited

PUBLICATIONS

Takao Harada et al., *Study on Crack Detection of Civil Infrastructures by Using PVDF Film Sensor*, Collection of Structural Engineering Treatises, vol. 59A, 2013, pp. 47-55.
Matsunaga, et al., "Fundamental Study of Electromagnetic Wave Propagation Type Coated Sensor for Detecting Infrastructure deterioration", 65 Materials and Environment Seminar Lecture Paper, Apr. 17, 2019, vol. 68, No. 7, pp. 178-181.

| CRACK POSITION | ma=3、mb=1 | ma=4、mb=3 | ma=3、mb=2 |
|---|---|---|---|
| (1)(0.43<Loc<1) | + | + | |
| (2)(0<Loc<0.43) | + | − | |
| (3)(−0.6<Loc<0) | − | | − |
| (4)(1<Loc<0.6) | − | | + |

CRACK DETECTION DEVICE AND METHOD THEREFOR

TECHNICAL FIELD

The present invention relates to a crack detection device for detecting a crack in a structure and a method for detecting a crack.

BACKGROUND ART

One method to detect a crack in a structure is to go to the site of the structure and to make visual inspection and a check with an instrument (for example, Non-Patent Document 1). In this method, the cost for dispatching workers is necessary and continuous monitoring is impossible.

One method to continuously detect a crack in a structure is to monitor the structure with a sensor, for example disclosed in Non-Patent Document 2, attached thereto. The sensor has, for example, a three-layer structure of conductor-insulator-conductor, and detects the presence or absence of a crack based on a change in its impedance.

CITATION LIST

Non-Patent Literature

Non-Patent Literature 1: Crack detection tool for concrete structures [searched on Nov. 6, 2018], Internet (URL:http://www.kurabo.co.jp/chem/kk_crack_sensor.html)

Non-Patent Literature 2: Takao Harada, and two others, "Study on crack detection of civil infrastructures by using PVDF film sensor", Journal of Structural Engineering Vol. 59A (March 2013) pp. 47-55.

SUMMARY OF THE INVENTION

Technical Problem

Unfortunately, since the shape of the sensor is fixed in advance, it is difficult to apply the sensor to various shapes of various structures. In addition, when a dielectric such as water adheres to a terminal of the sensor, the impedance of the sensor changes. It is difficult to distinguish a change in impedance due to the adhesion of a dielectric such as water or the passage of time from a change in impedance due to cracking.

In view of the problems, an object of the present invention is to provide a crack detection device that is capable of easily identifying a change in impedance due to cracking without being limited to the shape of a sensor, and a method for detecting a crack.

Means for Solving the Problem

A crack detection device according to an aspect of the present invention that detects a crack in a structure includes: a sensor unit that has a three-layer structure of conductor-insulator-conductor and is attached to the structure; a frequency characteristics acquisition unit that sweeps a predetermined frequency range to acquire a plurality of frequencies at which the impedance of the sensor unit is maximum or minimum; a crack presence/absence determination unit that determines the presence or absence of a crack based on a nonuniformity of the plurality of frequencies; a crack position table in which a relationship between crack positions and frequency shift directions is recorded; and a crack position detection unit that, when the crack presence/absence determination unit determines that there is a crack, takes a difference between two frequencies acquired by the frequency characteristics acquisition unit to determine a sign, and then refers to the crack position table in accordance with the sign to detect a crack position.

A method for detecting a crack according to an aspect of the present invention that is performed by a crack detection device including a sensor unit attached to a structure to be subjected to crack detection includes: a frequency characteristics acquisition step in which a predetermined frequency range is swept to acquire a plurality of frequencies at which the impedance of the sensor unit is maximum or minimum; a crack presence/absence determination step in which the presence or absence of a crack is determined based on a nonuniformity of the plurality of frequencies; and a crack position detection step in which, when it is determined that there is a crack in the crack presence/absence determination step, a difference between two frequencies acquired in the frequency characteristics acquisition step is taken to determine a sign, and then a crack position table, in which a relationship between crack positions and frequency shift directions is recorded, is referred to in accordance with the sign to detect a crack position.

Effects of the Invention

According to the present invention, there can be provided the crack detection device that is capable of easily identifying a change in impedance due to cracking without being limited to the shape of the sensor, and the method for detecting a crack.

DESCRIPTION OF EMBODIMENTS

Figure 1:
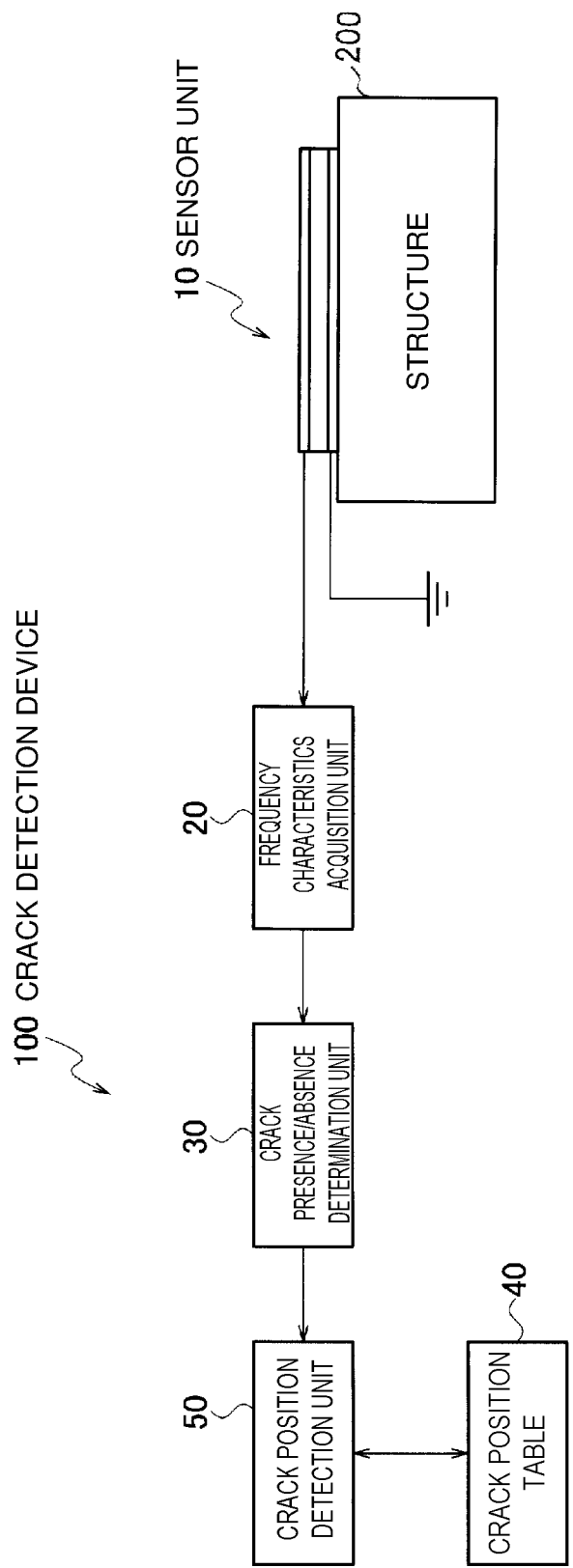
FIG. 1 is a block diagram showing an exemplary functional structure of a crack detection device according to an embodiment of the present invention.

Embodiments of the present invention will be described below with the drawings. The same reference characters are given to the same components throughout the drawings, and the description thereof will not be repeated.

Sensor Unit

A sensor unit used in an embodiment of the present invention is described. The sensor unit is configured to have a three-layer structure of conductor-insulator-conductor interposed between soft films.

The sensor unit is attached to a structure to be subjected to detection of the presence or absence of a crack in use. Considering the conductor near the structure of the sensor unit attached to the structure as one terminal and the outer conductor as the other terminal, the sensor unit can be expressed as an equivalent circuit of a transmission path expressed with one terminal pair AB and the other terminal pair CD.

The impedance Zt viewed from one terminal pair AB of the transmission path is represented by the following formula.

Formula 1

$$Zt = Zo \coth(\gamma Lt) \quad (1)$$

In the above formula, Zo represents the characteristic impedance of the transmission line, γ represents the propagation constant (complex number), and Lt represents the transmission line length. Now neglecting the attenuation constant (real number) α generally included in the propagation constant γ, assuming γ=jβ with the phase contact (real number) β and j=(−1)$^{0.5}$, and expanding Formula (1), the following formula is obtained.

Formula 2

$$Zt = Zo \coth(\gamma Lt) = Zo \frac{\cos(\beta Lt)}{j\sin(\beta Lt)} \quad (2)$$

When the inductance per unit length of the transmission line is Lo, the capacitance is Co, the circular constant is π, and the frequency is ω/2π, the relation β=ω(Lo Co)$^{105}$ is known from the distributed constant circuit theory. In Formula (2), from the trigonometric function having the variable of βLt=ω(Lo Co)$^{0.5}$Lt in the denominator and the numerator, the impedance has frequency characteristics in which the impedance periodically peaks. The period in which the impedance peaks is related to the transmission line length Lt, because the terminal pair CD acts as a reflecting point of electromagnetic waves and the standing wave is generated between the terminal pair AB and the terminal pair CD. When a structure is cracked, the crack acts as a reflecting point of electromagnetic waves and the frequency at which the standing wave is generated changes, and consequently the frequency at which the impedance peaks changes.

When the structure to be subjected to crack detection is installed outdoors, water may adhere to an edge of the sensor unit, for example, due to raindrops. When the structure is located indoors, water may also adhere to an edge of the sensor unit, for example, due to condensation. In these cases, the sensor unit is expressed by a circuit model in which the parasitic capacitance Cp caused by water adhesion is connected to the other terminal pair CD of the transmission line. The impedance viewed from the terminal pair AB is then represented by the following formula with γ=jβ.

Formula 3

$$Zt = Zo \coth(\gamma Lt + j\omega CpZo) = Zo \frac{\cos(\beta Lt + \omega CpZo)}{j\sin(\beta Lt + \omega CpZo)} \quad (3)$$

In Formula (3), the variable in the trigonometric function included in the denominator and the numerator is βLt+ωCpZo, and thus the frequency at which the standing wave is generated and the impedance peaks is dependent also on the parasitic capacitance Cp. Compared with the frequency at which the standing wave is generated in the absence of Cp as represented by Formula (2), the frequency at which the standing wave is generated in the presence of Cp changes.

In addition, the change in the dielectric constant of the insulator due to temperature, humidity, or the like, or the change due to the passage of time leads the change in the frequency at which the standing wave is generated.

In this way, in addition to crack occurrence in the structure, adhesion of a dielectric, such as water, to an edge of the sensor unit, or a change in a dielectric due to temperature, humidity, or the passage of time leads the change in the frequency at which the standing wave is generated. Therefore, it is necessary to distinguish the cases of adhesion of a dielectric, such as water, to an edge of the sensor unit and a change in a dielectric due to temperature, humidity, or the passage of time from the case of crack occurrence.

The crack detection device according to an embodiment of the present invention is configured to facilitate distinction between the change in impedance of the sensor unit due to crack occurrence in the structure and the change in impedance due to other factors, and not to be affected by the shape of the sensor unit.

Crack Detection Device

FIG. 1 is a block diagram showing an exemplary functional structure of a crack detection device according to an embodiment of the present invention. The crack detection device 100 shown in FIG. 1 includes a sensor unit 10, a frequency characteristics acquisition unit 20, a crack presence/absence determination unit 30, a crack position table 40, and a crack position detection unit 50.

The sensor unit 10 has a three-layer structure of conductor-insulator-conductor, and is attached to a structure 200. The sensor unit 10 can be formed with, for example, a PVDF film.

The frequency characteristics acquisition unit 20 sweeps a predetermined frequency range to acquire a plurality of frequencies at which the impedance of the sensor unit 10 is maximum or minimum. The frequency characteristics acquisition unit 20 can also be formed with a common measuring instrument such as an impedance analyzer. Alternatively, the frequency characteristics acquisition unit 20 may be formed with an FFT analyzer. The frequency characteristics of the sensor unit 10 may be measured with the FFT analyzer to determine a plurality of series resonance frequencies and parallel resonance frequencies. A specific example will be described later.

The crack presence/absence determination unit 30 determines the presence or absence of a crack based on a nonuniformity of the plurality of frequencies acquired by the frequency characteristics acquisition unit 20. When the sensor unit 10 is not cracked, respective intervals between the plurality of frequencies acquired by the frequency characteristics acquisition unit 20 are constant. When the sensor unit 10 is cracked, respective intervals between the plurality of frequencies vary. Thus, the crack presence/absence determination unit 30 can determine the presence or absence of a crack based on the nonuniformity of the plurality of frequencies. In addition, since the presence or absence of a crack is determined based on the nonuniformity of the plurality of frequencies, the size of the sensor unit 10 is not limited. In other words, the sensor unit 10 having any size can be used. Details will be described later.

The crack position table 40 is a table in which a relationship between crack positions on the sensor unit 10 and frequency shift directions is recorded. The crack position table 40 is provided in advance. A specific example will be described later.

When the crack presence/absence determination unit 30 determines that there is a crack, the crack position detection unit 50 takes a difference between two frequencies acquired by the frequency characteristics acquisition unit 20 to determine a sign, and then refers to the crack position table 40 in accordance with the sign to detect a crack position. Since the impedance characteristics of the sensor unit 10 change with the position where the crack occurs, the crack position detection unit 50 can identify the crack position by taking the difference between two frequencies and making a comparison with a predetermined reference. Details will be described later.

In this way, the crack detection device 100 according to the present embodiment that detects a crack in the structure 200 includes: the sensor unit 10 that has a three-layer structure of conductor-insulator-conductor and is attached to the structure 200; the frequency characteristics acquisition unit 20 that sweeps a predetermined frequency range to acquire a plurality of frequencies at which the impedance of the sensor unit 10 is maximum or minimum; the crack presence/absence determination unit 30 that determines the presence or absence of a crack based on a nonuniformity of the plurality of frequencies; the crack position table 40 in which a relationship between crack positions and frequency shift directions is recorded; and the crack position detection unit 50 that, when the crack presence/absence determination unit 30 determines that there is a crack, takes a difference between two frequencies acquired by the frequency characteristics acquisition unit 20 to determine a sign, and then refers to the crack position table 40 in accordance with the sign to detect a crack position.

Thus, the crack detection device 100 according to the present embodiment can easily identify a change in impedance due to cracking without being limited to the shape of the sensor.

Figure 2:
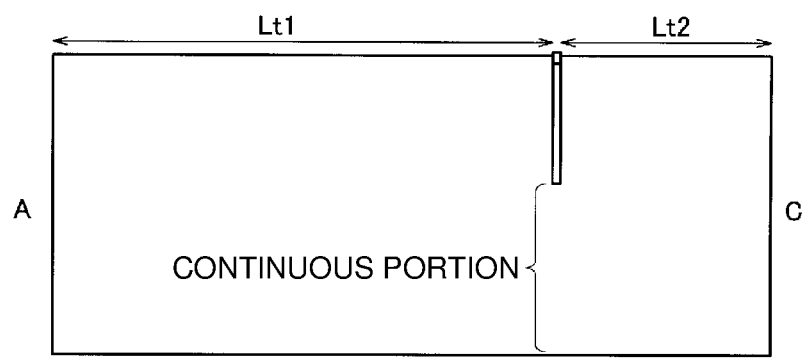
FIG. 2 schematically shows a plane of the sensor unit when there is a crack.
Figure 3:
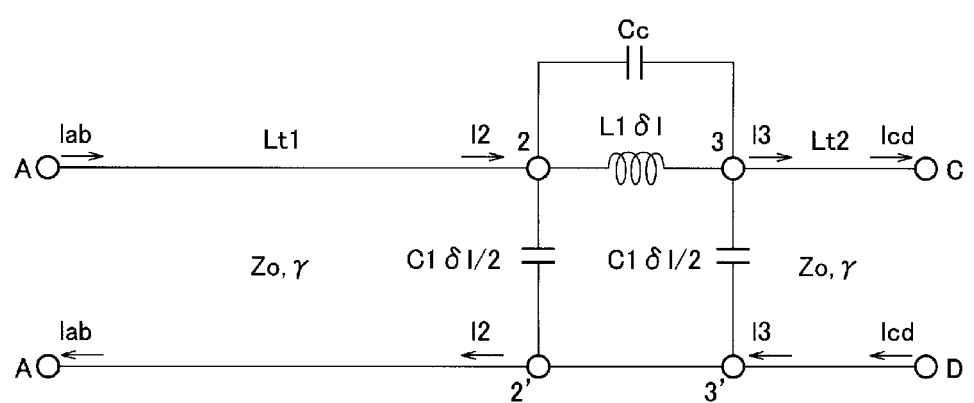
FIG. 3 shows a circuit model in which the sensor unit is expressed by transmission lines when there is a crack.

The principle of operation for detecting a crack is described in detail below. FIG. 2 is a schematic diagram of the sensor unit 10 when there is a crack, and FIG. 3 illustrates a circuit model when there is a crack. The schematic diagram of FIG. 2 shows a state in which a crack having a gap δ1 occurs at a position being Lt1 from the left end and Lt2 from the right end in the upper conductor. In the circuit model in FIG. 3, Cc represents a stray capacitance present in the gap of the crack, and L1 and C1 respectively represent an inductance and a capacitance per unit length when the continuous portion in FIG. 2 is regarded as a transmission line. For the transmission lines having the lengths Lt1 and Lt2, the characteristic impedance is Zo (real number) and the propagation constant is γ (complex number).

The potential difference between the terminals A and B is Vab, the potential difference between the terminals 2 and 2' is V2, the potential difference between the terminals 3 and 3' is V3, and the potential difference between the terminals C and D is Vcd. The current flowing along the transmission line at the terminal A is Iab, the current in the transmission line portion at the terminal 2 is I2, the current in the transmission line portion at the terminal 3 is I3, and the current flowing along the transmission line at the terminal C is Icd. According to the distributed constant circuit theory, Iab flows in the reverse direction at the terminal B. Similarly, I2 flows in the reverse direction at the terminal 2', I3 flows in the reverse direction at the terminal 3', and Icd flows in the reverse direction at the terminal D. Then, the following circuit equation holds for this circuit model.

Formula 4

$$Vab = K1 + K2 \tag{4}$$

$$Iab = \frac{K1}{Zo} - \frac{K2}{Zo} \tag{5}$$

$$V2 = K1 e^{-\gamma Lt1} + K2 e^{\gamma Lt1} \tag{6}$$

$$I2 = \frac{K1}{Zo} e^{-\gamma Lt1} - \frac{K2}{Zo} e^{\gamma Lt1} \tag{7}$$

$$I2 = j\omega \frac{C1}{2} \delta IV2 + \frac{1}{j\omega L1\delta|}(V2 - V3) + j\omega Cc(V2 - V3) \tag{8}$$

$$I3 = -j\omega \frac{C1}{2} \delta IV3 + \frac{1}{j\omega L1\delta|}(V2 - V3) + j\omega Cc(V2 - V3) \tag{9}$$

$$V3 = K3 + K4 \tag{10}$$

$$I3 = \frac{K3}{Zo} - \frac{K4}{Zo} \tag{11}$$

$$Vcd = K3 e^{-\gamma Lt2} + K4 e^{\gamma Lt2} \tag{12}$$

$$Icd = \frac{K3}{Zo} e^{-\gamma Lt2} - \frac{K4}{Zo} e^{\gamma Lt2} \tag{13}$$

Here, K1 and K2 are constants defined by the boundary conditions of the transmission line of the length Lt1, and K3 and K4 are constants defined by the boundary conditions of the transmission line of the length Lt2. In the above formula, e represents the base of the natural logarithm (Napier's constant).

Since the terminal CD is open, Icd=0 holds, and the relationship between K3 and K4 is represented by the following formula from Formula (13).

Formula 5

$$K3 = K4 e^{2\gamma Lt2} \tag{14}$$

Substituting Formula (14) into Formula (10), the following formula is obtained.

Formula 6

$$V3 = K4 e^{2\gamma Lt2} + K4 \tag{15}$$

Similarly, substituting Formula (14) into Formula (11), the following formula is obtained.

Formula 7

$$I3 = \frac{K4 e^{2\gamma Lt2}}{Zo} - \frac{K4}{Zo} \tag{16}$$

Dividing Formula (15) by Formula (16), the relational formula between V3 and I3 is given as follows.

Formula 8

$$\frac{V3}{I3} = \frac{K4 e^{2\gamma Lt2} + K4}{\frac{K4 e^{2\gamma Lt2}}{Zo} - \frac{K4}{Zo}} = Zo \frac{e^{2\gamma Lt2} + 1}{e^{2\gamma Lt2} - 1} = Zo \frac{e^{\gamma Lt2} + e^{-\gamma Lt2}}{e^{\gamma Lt2} - e^{-\gamma Lt2}} = Zo \coth(\gamma Lt2) \tag{17}$$

$$V3 = Zo I3 \coth(\gamma Lt2)$$

From Formula (9), V2 is represented by the following formula with V3 and I3.

Formula 9

$$I3 = \left(\frac{1}{j\omega L1\delta|} + j\omega Cc\right)V2 - \left\{\frac{1}{j\omega L1\delta|} + j\omega\left(Cc + \frac{C1}{2}\delta|\right)\right\}V3 \quad (18)$$

$$\frac{1-\omega^2 L1\delta|Cc}{j\omega L1\delta|}V2 = I3 + \frac{1}{j\omega L1\delta|}\left\{1-\omega^2 L1\delta|\left(Cc + \frac{C1}{2}\delta|\right)\right\}V3$$

$$V2 = \frac{j\omega L1\delta|}{1-\omega^2 L1\delta|Cc}I3 + \frac{1-\omega^2 L1\delta|\left(Cc + \frac{C1}{2}\delta|\right)}{1-\omega^2 L1\delta|Cc}V3$$

From Formula (8), I2 is represented by the following formula with V3 and I3.

Formula 10

$$I2 = \left[\frac{1}{j\omega L1\delta|} + j\omega\left(Cc + \frac{C1}{2}\delta|\right)\right]V2 - \left(\frac{1}{j\omega L1\delta|} + j\omega Cc\right)V3$$

$$I2 = \frac{1-\omega^2 L1\delta|\left(Cc + \frac{C1}{2}\delta|\right)}{j\omega L1\delta|}V2 - \frac{1-\omega^2 L1\delta|Cc}{j\omega L1\delta|}V3$$

Formula (18) is substituted into the above formula.

Formula 11

$$I2 = \frac{1-\omega^2 L1\delta|\left(Cc + \frac{C1}{2}\delta|\right)}{1-\omega^2 L1\delta|Cc}I3 + \quad (19)$$

$$\frac{\left\{1-\omega^2 L1\delta|\left(Cc + \frac{C1}{2}\delta|\right)\right\}^2}{j\omega L1\delta|(1-\omega^2 L1\delta|Cc)}V3 - \frac{1-\omega^2 L1\delta|Cc}{j\omega L1\delta|}V3$$

$$I2 = \frac{1-\omega^2 L1\delta|\left(Cc + \frac{C1}{2}\delta|\right)}{1-\omega^2 L1\delta|Cc}I3 +$$

$$\frac{\left\{1-\omega^2 L1\delta|\left(Cc + \frac{C1}{2}\delta|\right)\right\}^2 - (1-\omega^2 L1\delta|Cc)^2}{j\omega L1\delta|(1-\omega^2 L1\delta|Cc)}V3$$

$$I2 = \frac{1-\omega^2 L1\delta|\left(Cc + \frac{C1}{2}\delta|\right)}{1-\omega^2 L1\delta|Cc}I3 +$$

$$\frac{\left\{2-\omega^2 L1\delta|\left(2Cc + \frac{C1}{2}\delta|\right)\right\}\left(-\omega^2 L1\delta|\frac{C1}{2}\delta|\right)}{j\omega L1\delta|(1-\omega^2 L1\delta|Cc)}V3$$

$$I2 = \frac{1-\omega^2 L1\delta|\left(Cc + \frac{C1}{2}\delta|\right)}{1-\omega^2 L1\delta|Cc}I3 +$$

$$\frac{\left\{1-\omega^2 L1\delta|\left(Cc + \frac{C1}{4}\delta|\right)\right\}(j\omega C1\delta|)}{1-\omega^2 L1\delta|Cc}V3$$

Now using the parameters of Formula (20) to Formula (22), Formula (18) and Formula (19) are represented by Formula (23) and Formula (24), respectively.

Formula 12

$$Za = Zo\left\{1-\omega^2 L1\delta|\left(Cc + \frac{C1}{2}\delta|\right)\right\} \quad (20)$$

$$L2 = C1Zo^2\left\{1-\omega^2 L1\delta|\left(Cc + \frac{C1}{4}\delta|\right)\right\} \quad (21)$$

$$\eta = 1-\omega^2 L1\delta|Cc \quad (22)$$

$$V2 = \frac{j\omega L1\delta|}{\eta}I3 + \frac{Za}{Zo\eta}V3 \quad (23)$$

$$I2 = \frac{Za}{Zo\eta}I3 + \frac{j\omega L2\delta|}{Zo^2\eta}V3 \quad (24)$$

From Formula (6) and Formula (7), K1 and K2 are represented by Formula (25) and Formula (26), respectively.

Formula 13

$$K1 = \frac{e^{\gamma L1t}}{2}(V2 + ZoI2) \quad (25)$$

$$K1 = \frac{e^{\gamma L1t}}{2}\left(\frac{j\omega L1\delta|}{\eta}I3 + \frac{Za}{Zo\eta}V3 + \frac{Za}{\eta}I3 + \frac{j\omega L2\delta|}{Zo\eta}V3\right)$$

$$K1 = \frac{e^{\gamma L1t}}{2}\left(\frac{Za + j\omega L1\delta|}{\eta}I3 + \frac{Za + j\omega L1\delta|}{Zo\eta}V3\right)$$

$$K2 = \frac{e^{-\gamma L1t}}{2}(V2 - ZoI2) \quad (26)$$

$$K2 = \frac{e^{-\gamma L1t}}{2}\left(\frac{j\omega L1\delta|}{\eta}I3 + \frac{Za}{Zo\eta}V3 - \frac{Za}{\eta}I3 - \frac{j\omega L1\delta|}{Zo\eta}V3\right)$$

$$K2 = \frac{e^{-\gamma L1t}}{2}\left(\frac{-Za + j\omega L1\delta|}{\eta}I3 + \frac{Za - j\omega L1\delta|}{Zo\eta}V3\right)$$

When Lp=L1+L2 and Ln=−L1+L2, L1=(Lp−Ln)/2 and L2=(Lp+Ln)/2 are derived, then Formula (25) and Formula (26) are represented by the following formulas.

Formula 14

$$K1 = \frac{e^{\gamma L1t}}{2}\left\{\frac{Za + j\omega(Lp-Ln)\delta|/2}{\eta}I3 + \frac{Za + j\omega(Lp-Ln)\delta|/2}{Zo\eta}V3\right\} \quad (27)$$

$$K2 = \quad (28)$$
$$\frac{e^{-\gamma L1t}}{2}\left\{\frac{-Za + j\omega(Lp-Ln)\delta|/2}{\eta}I3 + \frac{Za - j\omega(Lp-Ln)\delta|/2}{Zo\eta}V3\right\}$$

Substituting Formula (17), Formula (27), and Formula (28) into Formula (4), the following formula is obtained for Vab.

Formula 15

$$Vab = \frac{e^{\gamma L1t}}{2}\left\{\frac{Za + \frac{j\omega(Lp-Ln)\delta|}{2}}{\eta}I3 + \frac{Za + \frac{j\omega(Lp+Ln)\delta|}{2}}{Zo\eta}ZoI3\coth(\gamma Lt2)\right\} + \quad (29)$$

-continued $$\frac{e^{-\gamma L1t}}{2}\left\{Za+\frac{j\omega(Lp-\mathrm{Ln})\delta|}{2}I3+\right.$$

$$\left.\frac{Za+\frac{j\omega(Lp+\mathrm{Ln})\delta|}{2}}{Zo\eta}ZoI3\coth(\gamma Lt2)\right\}=$$

$$\frac{Za}{\eta}I3+\left\{\frac{e^{\gamma L1t}-e^{-\gamma L1t}}{2}+\frac{e^{\gamma L1t}+e^{-\gamma L1t}}{2}\mathrm{Coth}(\gamma Lt2)\right\}+$$

$$\frac{j\omega Lp\delta|}{2\eta}I3\left[\frac{e^{\gamma L1t}+e^{-\gamma L1t}}{2}+\frac{e^{\gamma L1t}-e^{-\gamma L1t}}{2}\mathrm{Coth}(\gamma Lt2)\right\}+$$

$$\frac{j\omega Lp\delta|}{2\eta}I3\left[\frac{-e^{\gamma L1t}-e^{-\gamma L1t}}{2}+\frac{e^{\gamma L1t}-e^{-\gamma L1t}}{2}\mathrm{Coth}(\gamma Lt2)\right\}=$$

$$\frac{Za}{\eta}I3\{\sinh(\gamma Lt1)+\cosh(\gamma Lt1)\cosh(\gamma Lt2)+\frac{j\omega Lp\delta|}{2\eta}\cosh(\gamma+\gamma Lt1)+$$

$$\sinh(\gamma Lt1)\coth(\gamma Lt2)\}+\frac{j\omega Lp\delta|}{2\eta}I3\{-\cosh(\gamma Lt1)+\sinh(\gamma Lt1)\coth(\gamma Lt2)\}=$$

$$\frac{Za}{\eta\sin(\gamma Lt2)}I3\{\sinh(\gamma Lt1)+\sinh(\gamma Lt2)+\cosh(\gamma Lt1)\cosh(\gamma Lt2)\}+$$

$$\frac{j\omega Lp\delta|}{2\eta\sin(\gamma Lt2)}I3\{\cosh(\gamma Lt1)\sinh(\gamma Lt2)+\sinh(\gamma Lt1)\cosh(\gamma Lt2)\}+$$

$$\frac{j\omega \mathrm{Ln}\delta|}{2\eta\sin(\gamma Lt2)}I3\{-\cosh(\gamma Lt1)\sinh(\gamma Lt2)+\sinh(\gamma Lt1)\cosh(\gamma Lt2)\}$$

$$Vab=$$

$$\frac{Za}{\eta\sin(\gamma Lt2)}I3\cosh[\gamma(Lt1+\gamma Lt2)]+$$

$$\frac{j\omega Lp\delta|}{2\eta\sin(\gamma Lt2)}I3\sinh[\gamma(Lt1+Lt2)]+\frac{j\omega \mathrm{Ln}\delta|}{2\eta\sin(\gamma Lt2)}I3\sinh[\gamma(Lt1-Lt2)]$$

Now introducing the following parameters, Formula (29) is expanded as Formula (32).

Formula 16

$$Az=Za+j\omega\frac{Lp}{2}\delta| \quad (30)$$

$$\theta_z=\tan^{-1}\left(\frac{\omega Lp\delta|}{2Za}\right)$$

$$Za=|Az|\cos\theta z=|Az|\cosh(j\theta z)$$

$$\omega\frac{Lp}{2}\delta|=|Az|\sin\theta z=\frac{1}{j}|Az|\sinh(j\theta z) \quad (31)$$

$$Vab=\frac{I3}{\eta\sin(\gamma Lt2)}|Az|\cosh(j\theta z)\cosh[\gamma(Lt1+Lt2)]+\frac{jI3}{\eta\sin(\gamma Lt2)}\frac{1}{j}|Az| \quad (32)$$

$$\sinh(j\theta z)\sinh[\gamma(Lt1+Lt2)]+\frac{j\omega \mathrm{Ln}\delta|}{2\eta\sin(\gamma Lt2)}I3\sinh[\gamma(Lt1-Lt2)]=$$

$$\frac{I3|Az|}{\eta\sin(\gamma Lt2)}\{\cosh(j\theta z)\cosh[\gamma(Lt1+Lt2)]+\sinh(j\theta z)\sinh[\gamma(Lt1+Lt2)]\}+$$

$$\frac{j\omega \mathrm{Ln}\delta|}{2\eta\sin(\gamma Lt2)}I3\sinh[\gamma(Lt1-Lt2)]h[\gamma(Lt1+Lt2)]\}+$$

$$\frac{j\omega \mathrm{Ln}\delta|}{2\eta\sin(\gamma Lt2)}I3\sinh[\gamma(Lt1-Lt2)]$$

$$Vab=\frac{I3|Az|}{\eta\sin(\gamma Lt2)}\cosh\{\gamma(Lt1+Lt2)+j\theta z\}+$$

$$\frac{j\omega \mathrm{Ln}\delta|}{2\eta\sin(\gamma Lt2)}I3\sinh\{\gamma(Lt1-Lt2)\}$$

Substituting Formula (17), Formula (27), and Formula (26) into Formula (5), the following formula is obtained for Iab.

Formula 17

$$Iab=\frac{e^{\gamma L1t}}{2Zo}$$

$$\left\{\frac{Za+\frac{j\omega(Lp-\mathrm{Ln})\delta|}{2}}{\eta}I3+\frac{Za+\frac{j\omega(Lp+\mathrm{Ln})\delta|}{2}}{Zo\eta}ZoI3\coth(\gamma Lt2)\right\}-$$

$$\frac{e^{-\gamma L1t}}{2Zo}\left\{\frac{-Za+\frac{j\omega(Lp-\mathrm{Ln})\delta|}{2}}{\eta}I3+\frac{Za-\frac{j\omega(Lp+\mathrm{Ln})\delta|}{2}}{Zo\eta}ZoI3\coth(\gamma Lt2)\right\}=$$

$$\frac{Za}{\eta Zo}I3+\left\{\frac{e^{\gamma L1t}+e^{-\gamma L1t}}{2}+\frac{e^{\gamma L1t}-e^{-\gamma L1t}}{2}\coth(\gamma Lt2)\right\}+$$

$$\frac{j\omega Lp\delta|}{2\eta Zo}I3\left\{\frac{e^{\gamma L1t}-e^{-\gamma L1t}}{2}+\frac{e^{\gamma L1t}+e^{-\gamma L1t}}{2}\coth(\gamma Lt2)\right\}+$$

$$\frac{j\omega Lp\delta|}{2\eta}I3\left\{\frac{-e^{\gamma L1t}+e^{-\gamma L1t}}{2}+\frac{e^{\gamma L1t}+e^{-\gamma L1t}}{2}\coth(\gamma Lt2)\right\}=$$

$$\frac{Za}{\eta Zo}I3\{\cosh(\gamma Lt1)+\sinh(\gamma Lt1)\coth(\gamma Lt2)\}+$$

$$\frac{j\omega Lp\delta|}{2\eta Zo}I3\{\sinh(\gamma Lt1)+coch(\gamma Lt1)\coth(\gamma Lt2)\}+$$

$$\frac{j\omega \mathrm{Ln}\delta|}{2\eta Zo}I3\{-\sinh(\gamma Lt1)+coch(\gamma Lt1)\coth(\gamma Lt2)\}=$$

$$\frac{Za}{\eta Zo\sinh(\gamma Lt2)}I3\left\{\sinh(\gamma(Lt1+Lt2))+\right.$$

$$\frac{j\omega Lp\delta|}{\eta Zo\sinh(\gamma Lt2)}I3\cosh\{\gamma(Lt1+Lt2)\}+\frac{j\omega \mathrm{Ln}\delta|}{\eta Zo\sinh(\gamma Lt2)}I3coch\{\gamma(Lt1+Lt2)\}$$

Now expanding the above formula with Formula (30) and Formula (31), Iab is expressed as follows.

Formula 18

$$Iab= \quad (33)$$

$$\frac{I3}{\eta Zo\sinh(\gamma Lt2)}|Az|\cosh(j\theta z)\sinh\{\gamma(Lt1+Lt2)\}+\frac{jI3}{\eta Zo\sinh(\gamma Lt2)}\frac{1}{j}|Az|\sin$$

$$h(j\theta z)coch\{\gamma(Lt1+Lt2)\}+\frac{j\omega \mathrm{Ln}\delta|}{2\eta Zo\sinh(\gamma Lt2)}I3\cosh\{\gamma(Lt1-Lt2)\}=$$

$$\frac{I3|Az|}{\eta Zo\sinh(\gamma Lt2)}\left\{\cosh(j\theta z)\sinh(\gamma Lt2+Lt2)+\right.$$

$$\sinh(j\theta z)\cosh\{\gamma(Lt1+Lt2)\}+\frac{j\omega \mathrm{Ln}\delta|}{2\eta Zo\sinh(\gamma Lt2)j}I3\cosh\{\gamma(Lt1-Lt2)\}$$

-continued $$Iab = \frac{I3|Az|}{\eta Zo \sinh(\gamma Lt2)} \sinh\{\gamma(Lt1+Lt2)+j\theta z\} + \frac{j\omega Ln\delta|}{2\eta Zo \sinh(\gamma Lt2)} I3\cosh\{\gamma(Lt1-Lt2)\}$$

The impedance viewed from the terminal AB, Zab=Vab/Iab, is represented by the following formula from Formula (32) and Formula (33).

Formula 19

$$Zab = \frac{|Az|\cosh\{\gamma(Lt1+Lt2)+j\theta z\} + \frac{j\omega Ln\delta|}{2}\sinh[\gamma(Lt1-Lt2)]}{|Az|\sinh[(Lt1+Lt2)+j\theta z\} + \frac{j\omega Ln\delta|}{2}\cosh\{\gamma(Lt1-Lt2)\}} \quad (34)$$

Similar to the expansion of Formula (2) and Formula (3), assuming γ=jβ with a phase contact (real number) β and j=(−1)$^{0.5}$, the numerator of Zab is expanded as follows.

Formula 20 numerator of Zab = (35)

$$|Az|\cosh\{j\beta(Lt1+Lt2)+j\theta z\} + \frac{j\omega Ln\delta|}{2}\sinh\{j\beta(Lt1-Lt2)\} =$$

$$|Az|\cos\{\beta(Lt1+Lt2)+\theta z\} - \frac{\omega Ln\delta|}{2}\sin\{\beta(Lt1-Lt2)\}$$

The denominator of Zab is expanded as follows.

Formula 21 denominator of Zab = (36)

$$|Az|\sinh\{j\beta(Lt1+Lt2)+j\theta z\} + \frac{j\omega Ln\delta|}{2}\cosh\{j\beta(Lt1-Lt2)\} =$$

$$j|Az|\sin\{\beta(Lt1+Lt2)+\theta z\} + \frac{j\omega Ln\delta 1}{2}\cos\{\beta(Lt1-Lt2)\}$$

When a crack occurs, the variables in the trigonometric functions included in the denominator and the numerator of the formula of the transmission line impedance Zab have two variables: {β(Lt1+Lt2)+θz} and β(Lt1−Lt2). When no crack occurs and there is no adhesion (parasitic capacitance Cp) at the end of the transmission line, the variables in the trigonometric functions included in the formula of impedance have one variable βLt according to Formula (A-2), while when no crack occurs and there is an adhesion (parasitic capacitance Cp) at the end of the transmission line, the variables in the trigonometric functions included in the formula of impedance have one variable (βLt+ωCpZo) according to Formula (A-3). The discussion shows that the number of variables in the trigonometric functions included in the formula of impedance varies depending on the presence or absence of a crack. Here, Lt represents the transmission line length, and the relationship of Lt=Lt1+Lt2+δ1 holds.

Considering in terms of the relationship of β=ω(Lo Co)$^{0.5}$ and the variables in the trigonometric functions included in the formula of impedance, the period of the impedance peak without cracking is (Lo Co)$^{0.5}$Lt in the absence of Cp and (Lo Co)$^{0.5}$Lt+CpZo in the presence of Cp, that is, the period is constant independently of the frequency.

On the other hand, when there is a crack, for the component β(Lt1−Lt2) of the two variables, the period in which the impedance peaks is (Lo Co)$^{0.5}$(Lt1−Lt2). The component β(Lt1+Lt2)+θz is discussed as follows.

The parameter θz represented by the following formula is also represented by Formula (38) using Lp=L1+L2, Formula (20), and Formula (21).

Formula 22

$$\theta z = \tan^{-1}\left(\frac{\omega Lp\delta|}{2Za}\right) \quad (37)$$

$$\theta z = \tan^{-1}\left\{\omega\delta \left| \frac{L1+C1Zo^2[1-\omega^2 L1\delta|(Cc+C1\delta|/4)]}{2Zo[1-\omega^2 L1\delta|(Cc+C1\delta1/2)]} \right|\right\} \quad (38)$$

When a crack occurred in a structure is still in the initial stage with a very small crack gap δ1, the following approximation holds.

Formula 23

$$\theta_Z \cong -\omega\delta \left| \frac{L1+C1Zo^2\left[1-\omega^2 L1\delta\left|\left(Cc+\frac{C1\delta|}{4}\right)\right|\right]}{2Zo\left[1-\omega^2 L1\delta\left|\left(Cc+\frac{C1\delta|}{2}\right)\right|\right]} \right| \quad (39)$$

Further, in the region in which the frequency ω/2π is low, Formula (39) becomes the following Formula (40), and thus θz is directly proportional to the frequency.

Formula 24

$$\theta_Z \cong \omega\delta \left| \frac{L1+C1Zo^2}{2Zo} \right| \quad (40)$$

Therefore, in the region in which the crack occurred in a structure is still in the initial stage with a very small crack gap δ1 and the frequency is low, the period of the component {β(Lt1+Lt2)+θz} becomes {(Lo Co)$^{0.5}$(Lt1+Lt2)+(L1+C1Zo$^2$)δ1/(2Zo)}.

In addition, Lp, Ln, and |Az| in the initial stage of cracking are given by the following formulas.

Formula 25

$$Lp = \quad (41)$$

$$L1+C1Zo^2\left\{1-\omega^2 L1\delta\left|\left(Cc+\frac{C1}{4}\delta\right)\right|\right\} = L1+C1Zo^2 = L1+\frac{C1}{Co}Lo$$

$$Ln = -L1+C1Zo^2\left\{1-\omega^2 L1\delta I\left(Cc+\frac{C1}{4}\delta\right)\right\} = \quad (42)$$

$$-L1+C1Zo^2 = -\left(L1-\frac{C1}{Co}Lo\right)$$

$$|Az| = \left|Zo\left\{1-\omega^2 L1\delta I\left(Cc+\frac{C1}{2}\delta\right)\right\} + \quad (43)$$

$$j\omega\frac{Lp}{2}\delta\| \approx \sqrt{Zo^2+\left\{\omega\left(L1+\frac{C1}{Co}Lo\right)\frac{\delta|}{2}\right\}^2} \approx Zo$$

From Formula (42) and Formula (43), in the region in which the crack is still in the initial stage with a very small gap δ1 and the frequency is low, Ln and |Az| are constant relative to the frequency. Since the width of the cracked point in the conductor is smaller than the width of the conductor without cracking, Lo<L1 and Co>C1 hold. From Formula (42), Ln is a negative value.

Next, the frequency at which the admittance and the impedance peak is discussed in the region in which the crack is still in the initial stage with a very small gap δ1 and the frequency is low. Since the admittance is the reciprocal of the impedance, the frequency at which the admittance peaks corresponds to the frequency at which the numerator of Zab, Formula (35), is zero. Substituting Formula (41) to Formula (43) into Formula (35), the following formula is obtained.

Formula 26

$$\text{numerator of } ZB = Zo\cos\left\{\beta(Lt1+Lt2)+\omega\left(L1+\frac{C1}{Co}Lo\right)\frac{\delta1}{2Zo}\right\}+ \quad (44)$$
$$\omega\left(L1-\frac{C1}{Co}Lo\right)\frac{\delta1}{2}\sin\{\beta(Lt1-Lt2)\}$$

In the region in which the crack is still in the initial stage with a very small gap δ1 and the frequency is low, Zo>>ω(L1−LoC1/Co)δ1/2 holds, and the first term is dominant in Formula (44). However, since the range in which the numerator of Zab is near zero is concerned, the second term is not neglected and is taken into consideration in Formula (44).

The frequency at which Formula (44) is zero is considered to exist near the frequency at which the dominant first term of Formula (44) is zero. When the value of the cos function in the first term of Formula (44) is zero, the first term is zero. With the circular constant being represented by π, the value of the cos function is zero when the variable in the cos function is an odd multiple of π/2. Due to the nature of cos function, the cos function in the first term of Formula (44) may be approximated by the following formula near the point at which the value of the cos function is zero.

Formula 28

$$\frac{\pi}{2}n-\omega(LoCo)^{0.5}(Lt1+Lt2)-\omega\left(L1+\frac{C1}{Co}Lo\right)\frac{\delta1}{2Zo}, n=1,5,9 \quad (45)$$

$$-\frac{\pi}{2}n+\omega(LoCo)^{0.5}(Lt1+Lt2)+\omega\left(L1+\frac{C1}{Co}Lo\right)\frac{\delta1}{2Zo}, n=3,7,11 \quad (46)$$

Using Formula (45), Formula (46), and β=ω(Lo CO)$^{0.5}$, the frequency ω/2π, at which Formula (44) is zero, that is, the admittance peaks, satisfies the following conditions.

Formula 28

$$\frac{\pi}{2}n-\omega(LoCo)^{0.5}(Lt1+Lt2)-\omega\left(L1+\frac{C1}{Co}Lo\right)\frac{\delta1}{2Zo}+ \quad (47)$$
$$\omega\left(L1-\frac{C1}{Co}Lo\right)\frac{\delta1}{2Zo}\sin\{\omega(LoCo)^{0.5}(Lt1-Lt2)\}=0, n=1,5,9,$$

$$-\frac{\pi}{2}n-\omega(LoCo)^{0.5}(Lt1+Lt2)+\omega\left(L1+\frac{C1}{Co}Lo\right)\frac{\delta1}{2Zo}+ \quad (48)$$
$$\omega\left(L1-\frac{C1}{Co}Lo\right)\frac{\delta1}{2Zo}\sin\{\omega(LoCo)^{0.5}(Lt1-Lt2)\}=0, n=3,7,11,$$

Formula (47) and Formula (48) are summarized into the following formula.

Formula 29

$$\frac{\pi}{2}\frac{2m-1}{\omega}=(LoCo)^{0.5}(Lt1+Lt2)+\left(L1+\frac{C1}{Co}Lo\right)\frac{\delta1}{2Zo}+ \quad (49)$$
$$(-1)^m\left(L1-\frac{C1}{Co}Lo\right)\frac{\delta1}{2Zo}\sin\{\omega(LoCo)^{0.5}(Lt1-Lt2)\}, m=1,2,3,$$

The frequency at which the impedance peaks corresponds to the frequency at which the denominator of Zab, Formula (36), is zero. Substituting Formula (41) to Formula (43) into Formula (36), the following formula is obtained.

Formula 30

$$\text{denominator of } Zab = jZo\sin\left\{\beta(Lt1+Lt2)+\omega\left(L1+\frac{C1}{Co}Lo\right)\frac{\delta1}{2Zo}\right\}- \quad (50)$$
$$j\omega\left(L1-\frac{C1}{Co}Lo\right)\frac{\delta1}{2}\cos\{\beta(Lt1-Lt2)\}$$

In the region in which the crack is still in the initial stage with a very small gap δ1 and the frequency is low, Zo>>ω(L1−LoC1/Co)δ1/2 holds, and the first term is dominant in Formula (50). However, since the range in which the denominator of Zab is near zero is concerned, the second term is not neglected and is taken into consideration in Formula (50).

The frequency at which Formula (50) is zero is considered to exist near the frequency at which the dominant first term of Formula (50) is zero. When the value of the sin function in the first term of Formula (50) is zero, the first term is zero. The value of the sin function is zero when the variable in the sin function is an integer multiple of π. Due to the nature of sin function, the sin function in the first term of Formula (50) may be approximated by the following formula near the point at which the value of the sin function is zero.

Formula 31

$$\pi n-\omega(LoCo)^{0.5}(Lt1+Lt2)-\omega\left(L1+\frac{C1}{Co}Lo\right)\frac{\delta1}{2Zo}, n=1,3,5, \quad (51)$$

$$-\pi n+\omega(LoCo)^{0.5}(Lt1+Lt2)+\omega\left(L1+\frac{C1}{Co}Lo\right)\frac{\delta1}{2Zo}, n=2,4,6, \quad (52)$$

Using Formula (51), Formula (52), and β=ω(Lo Co)$^{0.5}$, the frequency ω/2π, at which Formula (44) is zero, that is, the admittance peaks, satisfies the following conditions.

Formula 32

$$\pi n-\omega_n(LoCo)^{0.5}(Lt1+Lt2)-\omega_n\left(L1+\frac{C1}{Co}Lo\right)\frac{\delta1}{2Zo}- \quad (53)$$
$$\omega_n\left(L1-\frac{C1}{Co}Lo\right)\frac{\delta1}{2Zo}\cos\{\omega_n(LoCo)^{0.5}(Lt1-Lt2)\}=0, n=1,3,5,$$

$$-\pi n+\omega_n(LoCo)^{0.5}(Lt1+Lt2)+\omega_n\left(L1+\frac{C1}{Co}Lo\right)\frac{\delta1}{2Zo}- \quad (54)$$
$$\omega_n\left(L1-\frac{C1}{Co}Lo\right)\frac{\delta1}{2Zo}\cos\{\omega_n(LoCo)^{0.5}(Lt1-Lt2)\}=0, n=2,4,6,$$

Formula (53) and Formula (54) are summarized into the following formula.

Formula 33

$$\frac{\pi m}{\omega_m} = (LoCo)^{0.5}(Lt1 + Lt2) + \left(L1 + \frac{C1}{Co}Lo\right)\frac{\delta 1}{2Zo} - \tag{55}$$

$$(-1)^m\left(L1 - \frac{C1}{Co}Lo\right)\frac{\delta 1}{2Zo}\cos\{\omega_m(LoCo)^{0.5}(Lt1 - Lt2)\}, \, m = 1, 2, 3,$$

In addition, summarizing Formula (49) and Formula (55), the following formula is obtained.

Formula 34

$$\frac{1}{4}\frac{m}{fm} = (LoCo)^{0.5}(Lt1 + Lt2) + \left(L1 + \frac{C1}{Co}Lo\right)\frac{\delta 1}{2Zo} + (-1)^m \tag{56}$$

$$\left(L1 - \frac{C1}{Co}Lo\right)\frac{\delta 1}{2Zo}\cos\left\{2\pi f_m(LoCo)^{0.5}(Lt1 - Lt2) + \frac{\pi}{2}m\right\}, \, m = 1, 2, 3,$$

In Formula (56), the frequency $fm = \omega m/2\pi$ is used.

Figure 4:
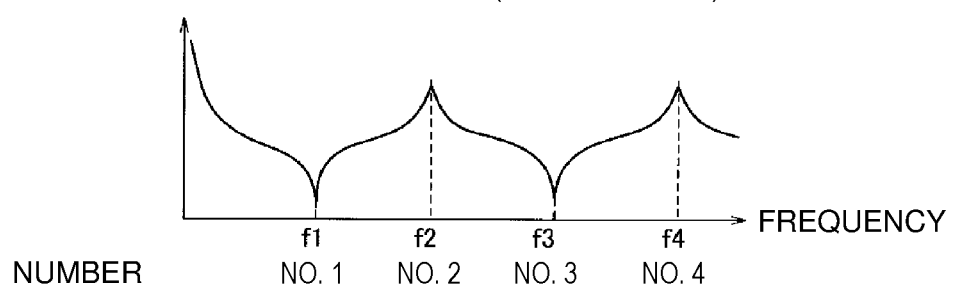
FIG. 4 schematically shows exemplary frequency characteristics of the impedance of the sensor unit.

FIG. 4 shows exemplary frequency characteristics of impedance. The minimum value of impedance at the frequencies f1 and f3 in FIG. 4 indicates the peak of admittance. Giving numbers to the peak frequencies of admittance and impedance in order from the direct current side, the numbers correspond to m in Formula (56).

When there is no crack, that is $\delta 1=0$, the peak frequency of admittance and impedance is periodic as discussed for Formula (2) and Formula (3). Thus, the difference between adjacent peak frequencies of admittance and impedance is constant. Consequently, when the peak frequency of admittance and impedance is normalized with the number m given in order from the direct current side, the normalized frequency is constant. In Formula (56), when $\delta 1=0$, the third term on the right side, which is dependent on the frequency, is zero, and then the frequency normalized with m, fm/m, is constant.

When there is a crack, fm/m is not constant. Thus, several peak frequencies of admittance and impedance are acquired, and then the presence or absence of a crack can be determined based on the agreement or disagreement among the frequencies normalized with m.

Next, the crack position is discussed. Although the crack position can be represented by either Lt1 or Lt2, it can also be represented by introducing a parameter normalized with the total length Lt1+Lt2, which is represented by the following formula.

Formula 35

$$Loc = \frac{Lt1 - Lt2}{Lt1 + Lt2} - 1 < Loc < 1 \tag{57}$$

Figure 5:
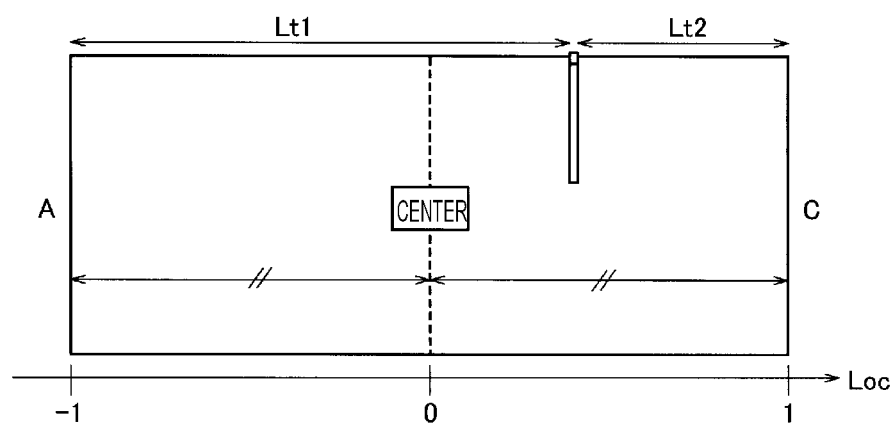
FIG. 5 shows an exemplary parameter representing a crack position.

FIG. 5 shows the relationship between the parameter Loc and a position on the transducer. Since the total length Lt1+Lt2 does not change during the measurement of peak frequencies of admittance and impedance, the denominator of Formula (57) is constant. At the center of the transducer, Lt1=Lt2, and thus Loc=0. Since Loc is directly proportional to Lt1, Loc is greater than 0 when a crack is located on the right side in FIG. 5 (Lt1 is greater). Since Loc is proportional to the number obtained by multiplying Lt2 by −1, Loc is smaller than 0 when a crack is located on the left side in FIG. 5 (Lt2 is greater).

Since the variable in the cos function in the third term on the right side of Formula (56) includes Lt1−Lt2, it is considered that the relational formula with the parameter Loc can be obtained by extracting only the third term. Considering that although fm/m is not constant due to cracking, it is near f1, and that f1 is near the lowest frequency fb at which the admittance peaks when there is no crack, fm is represented by the following formula.

Formula 36

$$fm = mfb + \delta f \tag{58}$$

Since fb is the frequency at which the standing wave is generated with ¼ wavelength, the following relationship holds with the total transducer length Lt1+Lt2 and the electromagnetic wave velocity $(Lo\, Co)^{-0.5}$.

Formula 37

$$fb = \frac{1}{4(LoCo)^{0.5}(Lt1 + Lt2)} \tag{59}$$

Expanding the cos function in the third term on the right side of Formula (56) with Formula (58), the following formula is obtained.

Formula 38

$$\cos\left\{2\pi fm(LoCo)^{0.5}(Lt1 - Lt2) + \frac{\pi}{2}m\right\} = \cos \tag{60}$$

$$\left\{2\pi(mfb + \delta f)(LoCo)^{0.5}(Lt1 - Lt2) + \frac{\pi}{2}m\right\} =$$

$$\cos\left\{2\pi(mfb)(LoCo)^{0.5}(Lt1 - Lt2) + \frac{\pi}{2}m\right\}\cos$$

$$\{2\pi\delta f(LoCo)^{0.5}(Lt1 - Lt2)\} + \sin\left\{2\pi(mfb)(LoCo)^{0.5}(Lt1 - Lt2) + \frac{\pi}{2}m\right\}$$

$$\sin\{2\pi\delta f(LoCo)^{0.5}(Lt1 - Lt2)\} \cong \cos\left\{2\pi(mfb)(LoCo)^{0.5}(Lt1 - Lt2) + \frac{\pi}{2}m\right\}2\pi\delta f(LoCo)^{0.5}(Lt1 - Lt2)\sin\left\{2\pi(mfb)(LoCo)^{0.5}(Lt1 - Lt2) + \frac{\pi}{2}m\right\}$$

In the expansion into Formula (60), $2\pi\delta f(Lo\, Co)^{0.5}(Lt1-Lt2) \ll 1$ is assumed. Substituting Formula (59) into Formula (60), the following formula is obtained.

Formula 39

$$\cos\left\{2\pi fm(LoCo)^{0.5}(Lt1 - Lt2) + \frac{\pi}{2}m\right\} \cong \tag{61}$$

$$\cos\left\{\frac{\pi}{2}m\frac{Lt1 - Lt2}{Lt1 + Lt2} + \frac{\pi}{2}m\right\} + \frac{\pi}{2}\frac{\delta f}{fb}\frac{Lt1 - Lt2}{Lt1 + Lt2}\sin$$

$$\left\{\frac{\pi}{2}m\frac{Lt1 - Lt2}{Lt1 + Lt2} + \frac{\pi}{2}m\right\}\cos\left\{2\pi fm(LoCo)^{0.5}(Lt1 - Lt2) + \frac{\pi}{2}m\right\} =$$

$$\cos\left(\frac{\pi}{2}mLoc + \frac{\pi}{2}m\right) + \frac{\pi}{2}\frac{\delta f}{fb}Loc\sin\left(\frac{\pi}{2}mLoc + \frac{\pi}{2}m\right)$$

Assuming that the first term of Formula (61) is sufficiently larger than zero and $\delta f/fb \ll 1$ holds, the cos function in the third term on the right side of Formula (56) is approximated by the following formula.

Formula 40

$$\cos\left\{2\pi fm(LoCo)^{0.5}(Lt1 - Lt2) + \frac{\pi}{2}m\right\} \cong \cos\left(\frac{\pi}{2}mLoc + \frac{\pi}{2}m\right) \tag{62}$$

Formula (56) is represented by the following formula with Formula (62).

Formula 41

$$= (LoCo)^{0.5}(Lt1 + Lt2) + \left(L1 + \frac{C1}{Co}Lo\right)\frac{\delta 1}{2Zo} + \qquad (63)$$

$$(-1)^m\left(L1 - \frac{C1}{Co}Lo\right)\frac{\delta 1}{2Zo}\cos\left(\frac{\pi}{2}mLoc + \frac{\pi}{2}m\right), m = 1, 2, 3,$$

Taking the difference between the reciprocals of the frequencies normalized with m arbitrarily for the ma-th frequency and the mb-th frequency, the third term dependent on Loc can be extracted, and the following formula is obtained.

Formula 42

$$\frac{1}{4}\left(\frac{ma}{fma} - \frac{mb}{fmb}\right) = \qquad (64)$$

$$BL\left\{(-1)^{ma}\cos\left(\frac{\pi}{2}ma\,Loc + \frac{\pi}{2}ma\right) - (-1)^{mb}\cos\left(\frac{\pi}{2}mb\,Loc + \frac{\pi}{2}mb\right)\right\}BL =$$

$$\left(L1 - \frac{C1}{Co}Lo\right)\frac{\delta 1}{2Zo}$$

The right side of Formula (64) can be derived without frequency, and ma and mb are numbers that can be determined in advance. In addition, the range of Loc is −1<Loc<1 for a transducer having any length Lt1+Lt2, and thus the right side of Formula (64), except BL, can be derived in advance for a transducer having any length. Since BL>0 as described for the above Formula (42), the positive and negative sign on the right side is the same as that on the left side. In Formula (64), fma and fmb on the left side are obtained by measuring the frequency dependency of admittance and impedance. Consequently, the results of the first evaluation function represented by Formula (65) for the combinations of Loc, and ma and mb are stored as the crack position table in advance, and then a region of Loc corresponding to a crack position can be reversely searched from the sign of the second evaluation function Evm represented by Formula (66), which is obtained from the measurement result of the frequency dependency of admittance and impedance, and the combination of ma and mb, as well as from the crack position table 40.

Formula 43

$$Evt = \qquad (65)$$

$$\text{sgn}\left\{(-1)^{ma}\cos\left(\frac{\pi}{2}ma\,Loc + \frac{\pi}{2}ma\right) - (-1)^{mb}\cos\left(\frac{\pi}{2}mb\,Loc + \frac{\pi}{2}mb\right)\right\}$$

$$Evm = \text{sgn}\left(\frac{ma}{fma} - \frac{mb}{fmb}\right) \qquad (66)$$

In Formula (65) and Formula (66), sgn is a sign function.

Figures 6A, 6B:
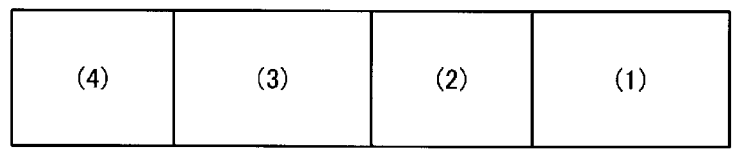
FIG. 6 shows an example of the crack position table in FIG. 1 and crack positions.

FIG. 6(a) shows an example of the crack position table 40 when the number of admittances and impedances is 4. For example, the sign of Evm at ma=3 and mb=1 is first evaluated, and when Evm is positive, Evm is then evaluated for ma=4 and mb=3. When Evm at ma=4 and mb=3 is positive, there is a crack in the region (1) on the transducer shown in FIG. 6(b).

As described above, the results of the first evaluation function represented by Formula (64) for the combinations of Loc, and ma and mb are stored as the crack position table 40 in advance, and then a region of Loc corresponding to a crack position can be reversely searched from the sign of Evm represented by Formula (65), which is obtained from the measurement result of the frequency dependency of admittance and impedance, and the combination of ma and mb, as well as from the crack position table 40.

A specific example of the frequency characteristics acquisition unit 20 is described.

Figure 7:
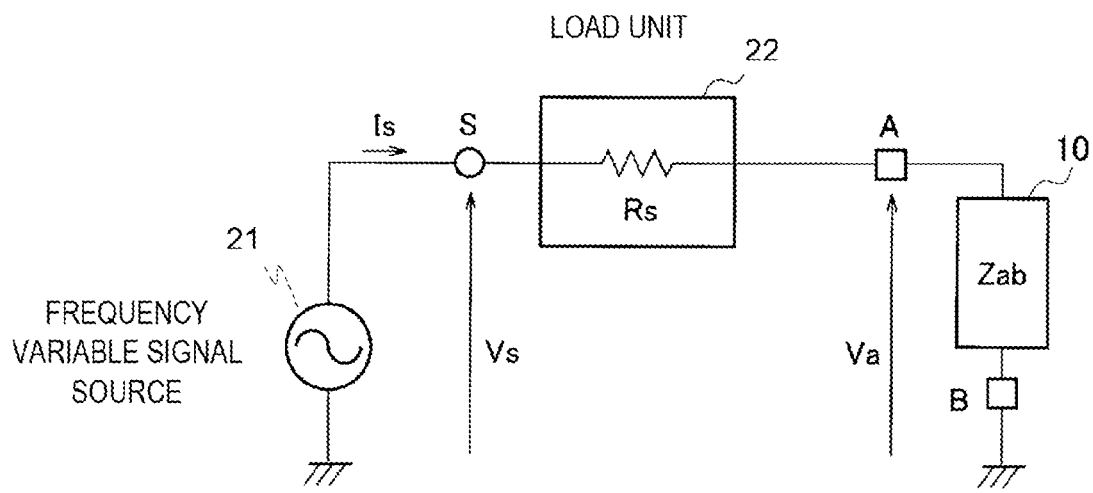
FIG. 7 is a block diagram showing a conceptual configuration of the frequency characteristics acquisition unit in FIG. 1.

The frequency characteristics acquisition unit 20 sweeps a predetermined frequency range to acquire a plurality of frequencies at which the impedance of the sensor unit 10 is maximum or minimum. FIG. 7 shows a circuit model including a frequency variable signal source 21 and a load unit 22 of the frequency characteristics acquisition unit 20, as well as the sensor unit 10. The voltage signal output from the frequency variable signal source 21 is applied to the sensor unit 10 via the load unit 22 (resistance Rs). As the impedance of the sensor unit 10 is high, the voltage Va between the terminals A and B is also high, thus the frequency at which Va peaks agrees with the frequency at which the impedance peaks. As the admittance of the sensor unit 10 is high, the current Is is high. As the current Is is high, the voltage drop in the load unit 22 is large, thus the magnitude of admittance is known by measuring Vs−Va. Consequently, the frequency at which Vs−Va peaks agrees with the frequency at which admittance peaks.

Figure 8:
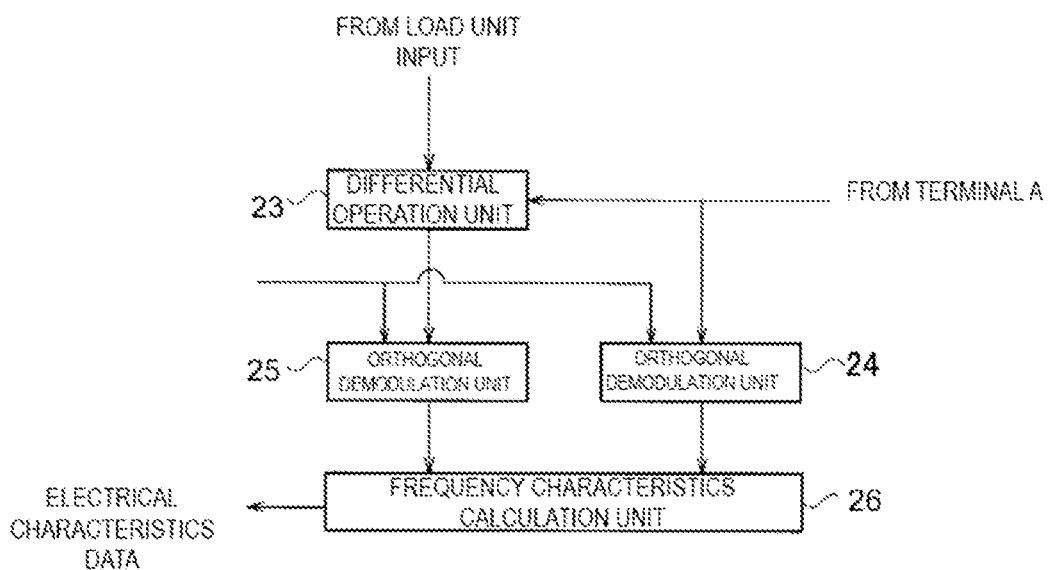
FIG. 8 is a block diagram showing an exemplary specific functional configuration of the frequency characteristics acquisition unit in FIG. 7.

FIG. 8 shows an exemplary configuration of the frequency characteristics acquisition unit 20. The signal from the terminal A is input to an orthogonal demodulation unit 24 and a differential operation unit 23. The orthogonal demodulation unit 24 separates the signal from the terminal A into the amplitudes of the in-phase component and the orthogonal component of the reference signal input from the frequency variable signal source 21, and outputs the separated signal to a frequency characteristics calculation unit 26. The differential operation unit 23 takes the difference between the signal from the load unit 22 and the signal from the terminal A, and outputs the difference to the orthogonal demodulation unit 25. The orthogonal demodulation unit 25 separates the input signal from the differential operation unit 23 into the amplitudes of the in-phase component and the orthogonal component of the reference signal, and outputs the separated signal to the frequency characteristics calculation unit 26. The frequency characteristics calculation unit 26 generates impedance data from the output signal of the orthogonal demodulation unit 24, and admittance data from the output signal of the orthogonal demodulation unit 25, and then transmits the data to the crack presence/absence determination unit 30 as frequency characteristics data.

The crack presence/absence determination unit 30 acquires the frequency characteristics data corresponding to the frequencies in a predetermined frequency range, and then extracts the frequencies at which the admittance and the impedance peaks and gives the corresponding number to each of the frequencies from the low frequency side.

Subsequently, when a plurality of normalized frequencies, which are obtained by normalizing the peak frequencies of admittance and impedance with the numbers, have a nonuniformity smaller than a predetermined nonuniformity, the crack presence/absence determination unit 30 determines that there is no crack. When the plurality of normalized frequencies have a nonuniformity equal to or greater than the predetermined nonuniformity, the crack position detection unit 50 checks the evaluation result of the second evaluation function, which is represented by Formula (66) with two numbers and peak frequencies, against the crack position table 40 to determines a crack position. The determination result of the presence or absence of a crack and the information on the crack position may be transmitted to the external via a communication unit (not shown).

As described above, a crack detection device 100 according to the present embodiment that detects a crack in a structure 200 includes: a sensor unit 10 that has a three-layer structure of conductor-insulator-conductor and is attached to the structure 200; a frequency characteristics acquisition unit 20 that sweeps a predetermined frequency range to acquire a plurality of frequencies at which the impedance of the sensor unit 10 is maximum or minimum; a crack presence/absence determination unit 30 that determines the presence or absence of a crack based on a nonuniformity of the plurality of frequencies; a crack position table 40 in which a relationship between crack positions and frequency shift directions is recorded; and a crack position detection unit 50 that, when the crack presence/absence determination unit 30 determines that there is a crack, takes a difference between two frequencies acquired by the frequency characteristics acquisition unit 20 to determine a sign, and then refers to the crack position table 40 in accordance with the sign to detect a crack position.

The crack presence/absence determination unit 30 gives numbers to the plurality of frequencies at which the impedance is maximum or minimum from a low frequency, starting with 1, calculates normalized frequencies by normalizing each frequency with the number given thereto, and determines that there is no crack when each of the plurality of normalized frequencies is equal, and determines that there is a crack when a plurality of different normalized frequencies are obtained. According to this determination method, the presence or absence of a crack is determined on the basis of a predetermined nonuniformity for the plurality of normalized frequencies obtained by normalizing the frequencies with the numbers, and thus the result is not affected by the shape of the sensor of the sensor unit 10. In other words, the sensor may have any shape.

As described above, the crack detection device 100 according to the present embodiment is capable of easily identifying a change in impedance due to cracking. The present invention is not limited to the above-described embodiments, and can be modified within the scope described in the claims.

REFERENCE SIGNS LIST 10 sensor unit
20 frequency characteristics acquisition unit
21 frequency variable signal source
22 load unit
23 differential operation unit
24, 25 orthogonal demodulation unit
26 frequency characteristics calculation unit
30 crack presence/absence determination unit
40 crack position table
50 crack position detection unit

The invention claimed is:

1. A crack detection device for detecting a crack in a structure, comprising:
a sensor unit that has a three-layer structure of conductor-insulator-conductor and is attached to the structure;
a frequency characteristics acquisition unit that sweeps a predetermined frequency range to acquire a plurality of frequencies at which an impedance of the sensor unit is maximum or minimum;
a processor; and
a non-transitory computer readable medium having stored thereon a crack position table in which a relationship between crack positions and frequency shift directions is recorded, the non-transitory computer readable medium also having stored thereon executable code that, when executed by the processor, causes the processor to function as:
a crack presence/absence determination unit that determines presence or absence of a crack based on a nonuniformity of the plurality of frequencies; and
a crack position detection unit that, when the crack presence/absence determination unit determines that there is a crack, takes a difference between two frequencies acquired by the frequency characteristics acquisition unit to determine a sign, and then refers to the crack position table in accordance with the sign to detect a crack position.

2. The crack detection device according to claim 1, wherein the crack presence/absence determination unit gives numbers to the plurality of frequencies at which the impedance is maximum or minimum from a low frequency, starting with 1, calculates normalized frequencies by normalizing each frequency with the number given thereto, and determines that there is no crack when each of the plurality of normalized frequencies is equal, and determines that there is a crack when a plurality of different normalized frequencies are obtained.

3. A method for detecting a crack that is performed by a crack detection device including a sensor unit attached to a structure to be subjected to crack detection, the method comprising:
a frequency characteristics acquisition step in which a predetermined frequency range is swept to acquire a plurality of frequencies at which an impedance of the sensor unit is maximum or minimum;
a crack presence/absence determination step in which presence or absence of a crack is determined based on a nonuniformity of the plurality of frequencies; and
a crack position detection step in which, when it is determined that there is a crack in the crack presence/absence determination step, a difference between two frequencies acquired in the frequency characteristics acquisition step is taken to determine a sign, and then a crack position table, in which a relationship between crack positions and frequency shift directions is recorded, is referred to in accordance with the sign to detect a crack position.

* * * * *